Sept. 28, 1943.  J. RANTASA  2,330,623
CROSS-COUNTRY MOTOR VEHICLE
Filed Feb. 27, 1940   2 Sheets-Sheet 1
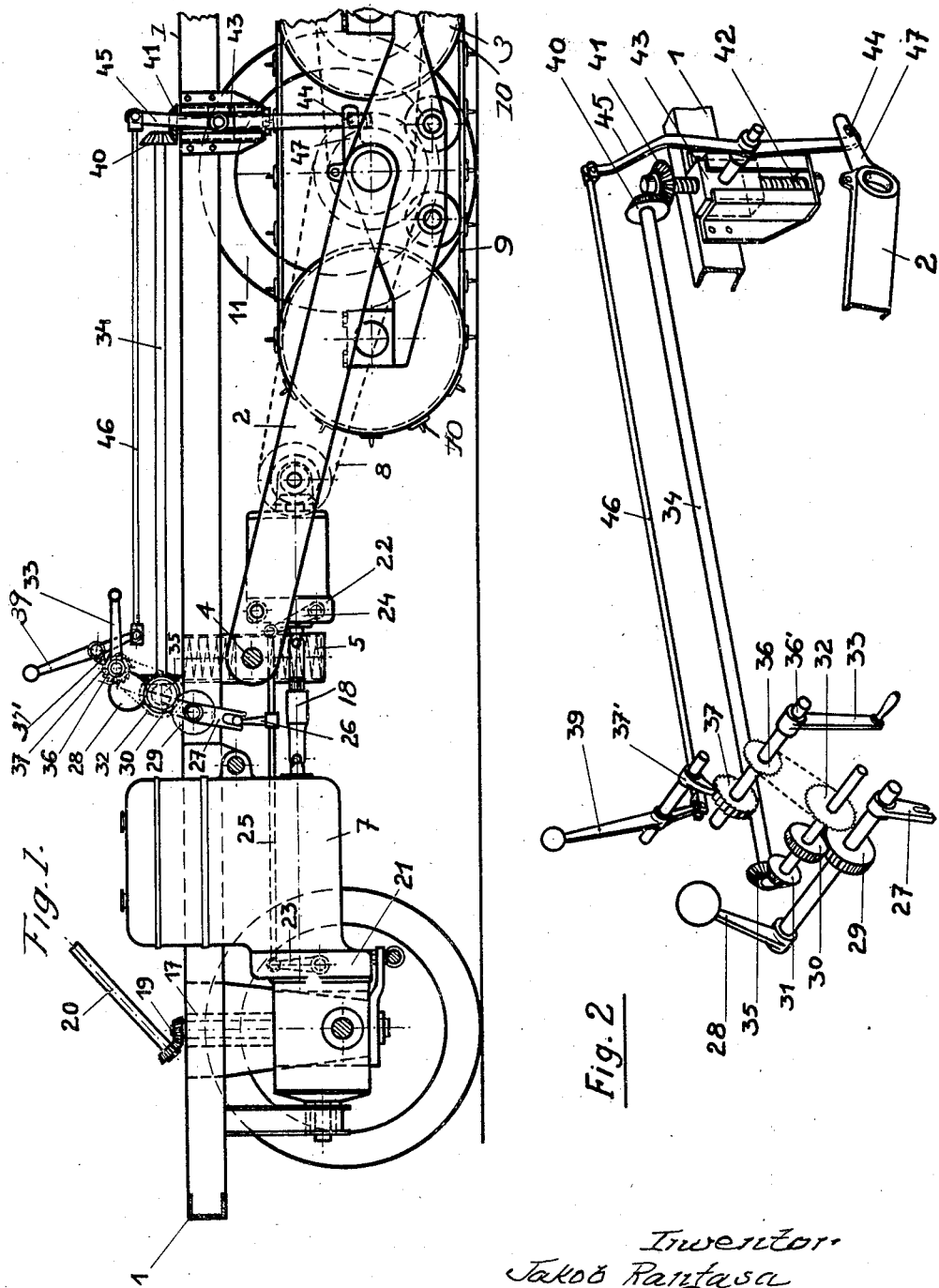
Inventor:
Jakob Rantasa

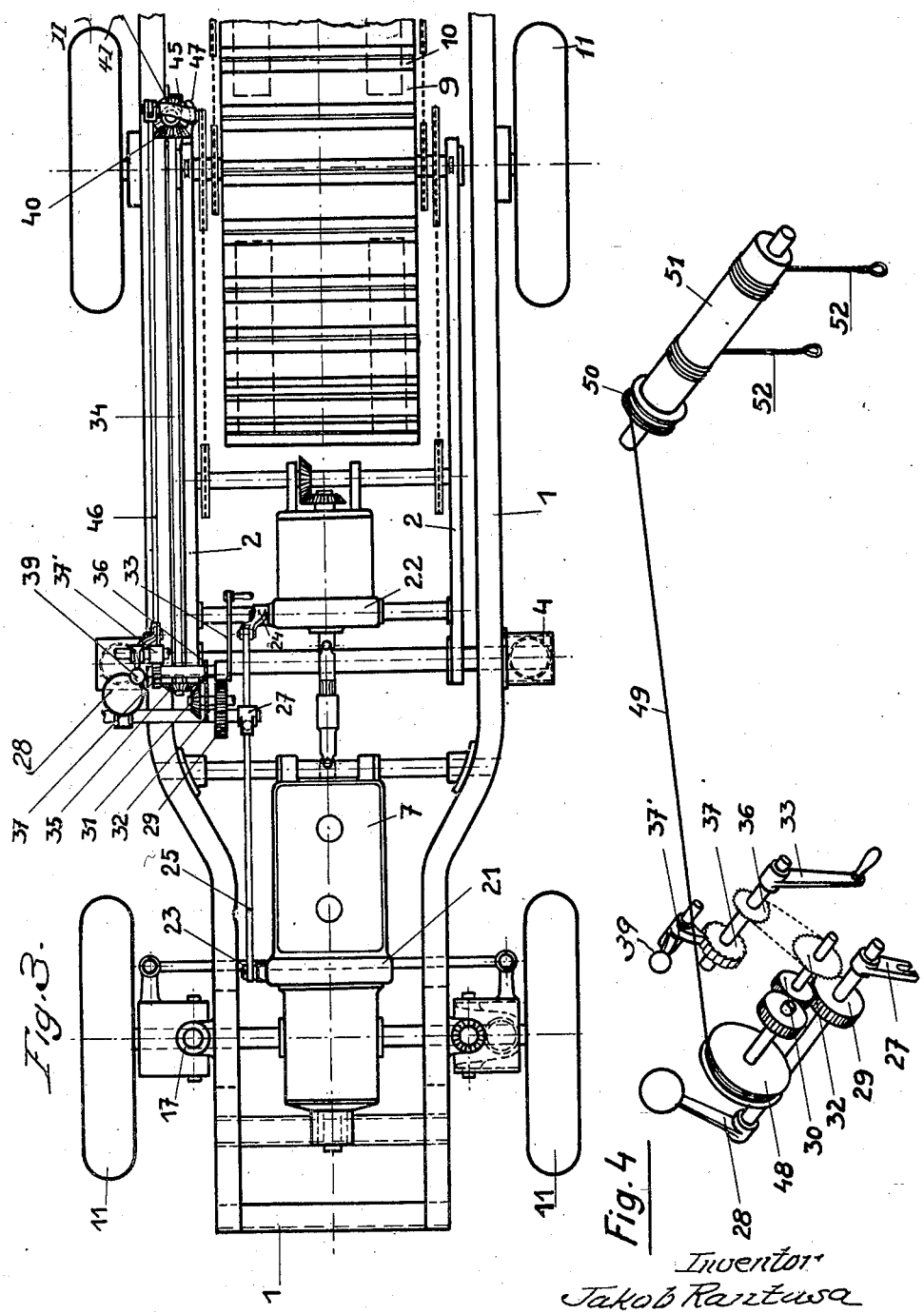

Patented Sept. 28, 1943

2,330,623

UNITED STATES PATENT OFFICE 2,330,623

CROSS-COUNTRY MOTOR VEHICLE

Jakob Rantasa, Vienna, Germany; vested in the Alien Property Custodian

Application February 27, 1940, Serial No. 321,122

8 Claims. (Cl. 180—9.1)

This invention relates to an improved motor cross-country vehicle supported by wheels and provided with an endless track for driving the vehicle when running over difficult country, this endless track being oscillatably mounted between the free ends of two frame members, the other ends of these members being oscillatably or pivotally supported by bearings mounted on the vehicle so as to be capable of oscillation relative thereto.

The object of this invention is to equip the vehicle with front wheel drive and with means for lifting the endless track clear of the ground and disengaging its drive.

A further object of the present invention consists of means to effect this change of drives automatically with the lifting or lowering of the endless track.

An example of a cross-country vehicle according to the invention is shown in the accompanying drawings in which:

Fig. 1 is a side elevation of the vehicle with the frame part removed,

Figure 2 is a perspective view of the changing means in cooperation with the means for raising the endless track.

Figure 3 is a plan view of Figure 1.

Figure 4 is a perspective view of a modified form of the changing means for raising the endless track.

In the drawings, 1 indicates the vehicle frame, 2 the two oscillating frame members carrying between the free ends the endless track wheel. 3, the bearings 4 of these frame members being oscillatably mounted by springs 5 on an upright 6 in the front part of the vehicle. The motor 7 is here shown as being mounted on the frame 1, but can be mounted on the oscillating frame members 2. The chain drive of the endless track is operated by means of suitable shafting and gears. The endless track band 9 is provided with grips 10.

The front wheels 11 of the vehicle are mounted on stub axles 17 and connected by gearing 19 with the steering shaft 20.

The motor 7 is provided with a shaft 18 operating in both directions i. e. forwards and backwards, on the one hand to the front-wheels drive and on the other hand to the endless track drive, by the couplings 21 and 22, respectively. Each of these couplings carries a switch lever 23, 24 pivotally connected to the ends of a rod 25. This rod engages a recess in the switch fork 27 by an arm 26; the axle of this fork 27 carries a weight 28 and a tooth wheel 29 situated in front of this weight. The wheel 29 engages a wheel 30 mounted upon the same axle upon which a bevel wheel 31 is mounted (Fig. 3). This bevel wheel 31 engages a bevel wheel 35 mounted upon the shaft 34, while a chain wheel 32 mounted upon the same shaft with the wheel 30, is connected with the chain wheel 36, on the axle 36' on which is fixed a ratchet wheel 37, the pawl 37' of which is fixed on an axle, on which is mounted a hand lever 39. A crank 33 mounted on the end of the axle 36' is used to rotate the wheels 36 and 37. It will be understood from the description and showing that the pawl 37' is disengaged from the racket wheel 37 when the crank 33 is to be rotated clockwise and to be reengaged with the rachet wheel when the nut 43 has arrived in its uppermost position. As the only purpose of the pawl 37 is to prevent movement of the crank 33 under vibration incident to the movement of the vehicle, it will be understood that the pawl is operated by hand in its disengagement and engagement in the particular steps in the operation of the device.

On the other end of the shaft 34 is provided a bevel wheel 40 which engages the bevel wheel 41 fixed to a screw spindle 42 which is situated in the member 43 provided with screw threads. A lever 45 is pivotally mounted upon the member 43 (Fig. 1) and has one end having the form of a projection 44, while the other end is pivotally connected with the hand lever 39 by means of the rod 46 (Figs. 1 and 3). The projection 44 engages under an arm 47 provided at the end of the swinging frame 2.

If the vehicle is moved by means of the endless track drive, then the coupling 22 is switched on and the coupling 21 is switched off. If now the front wheel drive is to be switched on, then by turning the crank 33, the bevel wheel drive 31, 35 and 40, 41 is first caused to rotate, so that the member 43 is moved upward, its projection 44 also causing an upward movement of the endless track, this endless track then being locked in high position by the pawl 37' engaging the ratchet wheel 37. In the meantime, the fork lever 27 has been moved by means of the chain wheels 36, 32 and the tooth wheels 30, 29 and moves the arm 26, through which the rod 25 is shifted in the direction of the coupling 21, so that the endless track drive is switched off and the front wheel drive is switched on. During the operation the arm 26, incident to the drive including chain wheels 36, 32, gears 30 and 29, the shaft 34 is operated and the track raised from the ground during transmission change from the track drive to the wheel drive.

The switching or engaging on of the endless track drive is carried out by first turning the hand lever 39 and then the crank 33 in other direction, thus removing the projection 44 of the member 43 and freeing the endless track 3 which drops to the ground by gravity. Meantime the rotation of the crank 33 causes the moving of the lever 27 and thereby the switching on of the endless track drive. This turning of the crank 33 moves the member 43 and the projection 44 back into their original positions in which the projection 44 extends under the arm 47 of the frame member 2.

In the modification shown in Figure 4, the parts 27, 28, 29, 30, 32, 36, 37, 37' and 39 are arranged and connected as in the first form and identified by the reference numerals. In this form, however, the lifting means for the track includes a drum 48, mounted on an auxiliary shaft and gear driven from gear 30. A cable 49, wound about drum 48 extends to a drum 50 secured on a drum shaft 51 supported in or from frame 1. Cables 52 are wound on drum shaft 51 and connected at their free ends to appropriate points on frame. The operation is obviously the same as in the form first described.

If runners are mounted on the wheels, the change of the drive from the endless track to the front wheels can only be effected when the runners are removed.

Having now described the nature of my invention, I declare that what I claim is:

1. In a cross-country motor vehicle, a vehicle frame having ground wheels, endless track frame members swingingly mounted in the vehicle frame, an endless track mounted in the endless track frame member, a motor, a connection for driving a part of the ground wheels from the motor, a connection for driving the endless track from the motor, manually operable means for reversely controlling said connections between the motor and ground wheels and the motor and endless track, whereby when the motor is connected to one such part it is free of connection with the other, an element to be connected to the endless track frame for raising the endless track to a position free of the ground surface, a manually operable element for releasing said raising means from the endless track frame to permit said frame to move by gravity to position the endless track in contact with the ground, and a connection leading from the manually operable means for selectively governing the motor drive, said connection positioning the raising means for the endless track frame in position to engage said lowered endless track frame, and raise said frame to free the endless track from the ground surface.

2. In a cross-country motor vehicle, a vehicle frame having ground wheels, an endless track frame swingingly supported in the vehicle frame, an endless track carried by the endless track frame, a motor, a driving connection between the motor and a part of the ground wheels, a connection between the motor and the endless track for driving the latter, a rod-like element for controlling said connections and operable in reverse directions to reversely control the connection between the motor and the ground wheels, and between the motor and the endless track, whereby when the ground wheels are driven, the endless track is idle, and when the endless track is driven, the ground wheels are idle, means cooperating with the endless track frame and operable to raise the frame to free the endless track from the ground surface, a manualy operable connection for releasing the raising means to permit the endless track to move into contact with the ground surface by gravity, and manually operable means for controlling the rod-like element and the raising means for appropriately governing the connection between the motor and ground wheels, and between the motor and the endless track, said manually operable means acting to simultaneously operate the endless track raising means to raise the endless track and shift the rod element to disconnect the endless track from the motor.

3. A construction as defined in claim 2 wherein the manually operable means includes a shaft, a crank for operating the shaft, a second shaft geared to the raising means, and an arm connected to the rod element, the operation of the crank driving the second shaft and moving the arm to actuate the rod element.

4. A construction as defined in claim 1 including means for securing the raising means and thereby the endless track in elevated position.

5. In a cross-country vehicle, a vehicle frame, ground wheels therefor, an endless track frame swingingly supported in the vehicle frame, an endless track mounted in the endless track frame, a motor, means for connecting the motor for driving action of a part of the ground wheels, means for connecting the motor for driving action of the endless track, a rod movable to reversely control said connections to provide for driving of the ground wheels or endless track, a stop on the endless track frame, a lever mounted for pivotal movement and terminating in a hook to engage beneath said stop, a threaded connection for elevating the lever, a manually operable element for shifting the lever on its pivot to release the hook from the stop and permit the endless track frame to gravitate to a position to engage the endless track with the ground surface, a rod controlling the threaded connection of the lever to move the same upwardly and lift the endless track from the ground surface, an arm connected with the rod, and a manually operable element for shifting the rod to disconnect the motor and ground wheels and connect the motor and endless track, or reversely, to disconnect the ground wheels from the motor and connect the endless track thereto, said elements simultaneously moving the shaft connected to the raising lever to raise said lever for elevating the endless track when the rod is shifted to disconnect the raising track and connect the ground wheels to the motor, said shaft in the operation of the manually operable element to shift the rod to disconnect the ground wheels and connect the endless track to the motor, moving the shaft connected to the raising lever to lower said lever to a position to engage beneath the stop on the endless track frame.

6. In a cross-country vehicle as defined in claim 5 including a crank axle bearing, a ratchet wheel and a chain wheel, a pawl on the hand lever engaging this ratchet wheel, and means to transmit the movement of the said chain wheel to the means for raising the endless track.

7. In a cross-country vehicle as defined in claim 2 including a supporting lever for the swinging frame of the endless track with means for connecting the said lever with the rod-like element for transmitting and switching the rotary movement of the motor to the front wheel drive.

8. In a cross-country vehicle as defined in claim 2 including locking means for the lifting lever for the endless track.

JAKOB RANTASA.